Sept. 22, 1953　　F. L. McMILLAN ET AL　　2,652,721
THERMAL FLOWMETER
Filed Feb. 18, 1949　　　　　　　　　　　2 Sheets-Sheet 1

INVENTORS
F. L. McMILLAN
B. F. WILEY
BY Hudson & Young
ATTORNEYS

INVENTORS
F. L. McMILLAN
B. F. WILEY
BY Hudson & Young
ATTORNEYS

Patented Sept. 22, 1953

2,652,721

UNITED STATES PATENT OFFICE 2,652,721

THERMAL FLOWMETER

Fred L. McMillan and Bruce F. Wiley, Bartlesville, Okla., assignors to Phillips Petroleum Company, a corporation of Delaware Application February 18, 1949, Serial No. 77,232

6 Claims. (Cl. 73—155)

This invention relates to a flow meter and, more particularly, to a flow meter in which compensation is provided for the effects of temperature variations in the fluid whose flow rate is to be determined.

Heretofore, many problems have arisen in measuring flow rate due to ambient temperature variations in the fluid whose flow rate is to be measured. This is particularly true of flow meters wherein the flow rate is measured by adding heat to the liquid and then measuring the rate at which the heat is dissipated by the fluid. It is apparent that such a system is extremely sensitive to variations in the temperature of the fluids.

It is an object of our invention to provide apparatus for measuring flow rates which is not affected by ambient temperature variations.

It is a further object of the invention to provide a flow meter in which the heating current is effectively separated from the current to be measured while still utilizing a minimum number of conductors in the cable connecting the flow meter with the point at which measurements are indicated.

It is a still further object to provide a flow meter which is simple in construction, rugged, durable, and which utilizes a minimum number of circuit components.

Various other objects, advantages and features of the invention will become apparent from the following detailed description, taken in conjunction with the accompanying drawings, in which:

Figure 1 is a vertical sectional view, partially in elevation, of the flow meter of our invention;

Figures 2 and 3 are, respectively, sectional views taken along the lines 2—2 and 3—3 of Figure 1;

Figure 1:
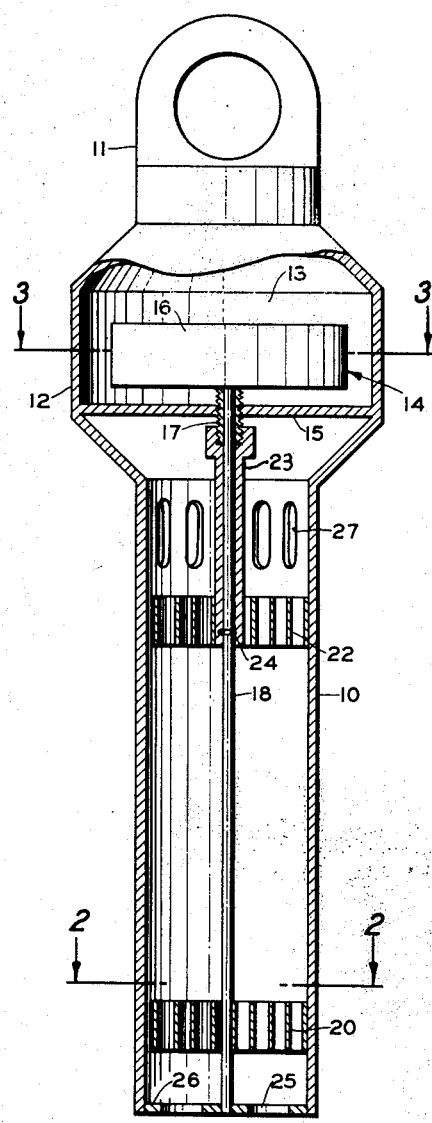
Figure 2:
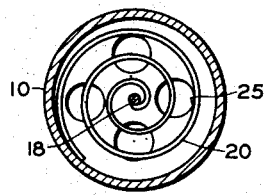
Figure 5:
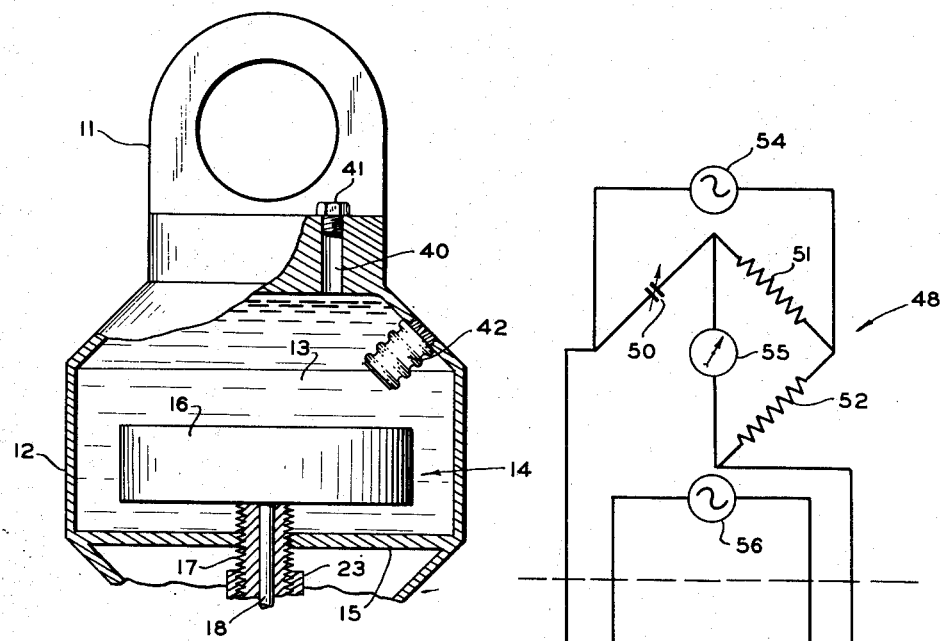
Figure 5 is a modified form of the flow-meter illustrated in Figure 1.

Referring now to the drawings in detail, and particularly to Figure 1, the flow meter comprises an elongated generally cylindrical casing 10 which is adapted to be lowered into a bore hole, this casing being supported within the bore hole by a cable, not shown, which is secured to a ring 11 and contains a plurality of electrical conductors. The casing 10 has an enlarged portion 12 defining a chamber 13, and a telemetering device 14 is mounted within the chamber upon a plate 15. The telemetering device has the function of transmitting signals from the casing 10, which is located at the region of the bore hole where flow is to be measured, to a distant location, such as the surface of the bore hole. Preferably and advantageously, the telemetering device is a variable resistance having a stator 16, a bushing 17, and an elongated control shaft 18. The variable resistance may be of water-tight construction to eliminate problems of sealing the chamber 13 from the bore hole. Alternatively and preferably, the chamber 13 may be filled with oil, see Figure 5, which minimizes the sealing problem. A bellows 42 or diaphragm may be mounted in the chamber to equalize interior and exterior pressures, see also Figure 5. Oil is admitted to chamber 13 through a passage 40 in casing 10. Passage 40 has a plug 41 inserted therein. In some cases, a variable condenser may be used instead of the variable resistance, and other types of telemetering devices will readily suggest themselves to one skilled in the art.

The flowmeter further includes a temperature sensitive element 20 consisting of a coil secured at one end to the casing and, at the other end, to the control shaft 18 so that the control shaft is rotated responsive to expansion and contraction of the coil 20 caused by temperature changes. A second temperature sensitive element or coil 22 has one end thereof secured to the casing and its other end secured to a sleeve 23 which is rotatable with the control shaft and secured to the threaded bushing 17 of the variable resistance. A gasket 24 is mounted between the bushing and control shaft to prevent liquids from flowing into the casing of the resistor. The bushing is loosely threaded in the plate 15 so that said bushing is freely rotatable relative to the plate responsive to expansion and contraction of the temperature sensitive element 22 caused by temperature changes. The elements 20 and 22 are so arranged that an increase in temperatures produces rotation of the stator 16 and control shaft 18 in the same direction and by the same amount. Accordingly, changes in ambient temperature produce no relative movement between the stator and control shaft and, hence, do not change the ohmic value of the variable resistance. Thus, it may be considered that the temperature sensitive elements cause movement of the telemetering resistance elements attached thereto in like direction to compensate the variable resistance for ambient temperature fluctuations, a rotation of the stator caused by an increase or decrease in temperature of one coil being offset by rotation of the control shaft in the same direction produced by an increase or decrease in temperature of the other coil.

Figure 4:
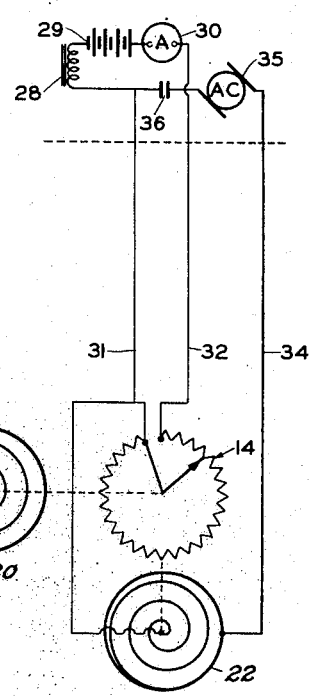
Figure 4 is a schematic diagram of the flow meter.

In the operation of the device, liquid whose flow rate is to be measured flows upwardly through the casing 10, this liquid entering through openings 25 in a bottom plate 26, leaving through a series of circumferentially spaced openings 27 at the top of the casing 10. Referring now to Figure 4, the variable resistance 14 is connected in circuit with a choke 28, a battery 29, and a meter 30 by conductors 31 and 32, which extend through a supporting cable to the surface. In accordance with the invention, the coil 22 is heated by current supplied through conductor 31, and a third cable conductor 34, these conductors being connected in circuit with an alternating current source 35 and a condenser 36 at the surface. It will be apparent that condenser 36 excludes direct current from the heating circuit, and choke 30 has sufficient inductance as to exclude alternating current from the direct current measuring circuit. Accordingly, only three conductors are necessary to supply both measuring and heating current to the flow meter.

Assuming that the liquid whose flow rate is to be measured flows upwardly through the casing, it will be apparent that the angular displacement of element 20 (in a clockwise direction, Figure 3, for example) is proportional to the ambient temperature of the fluid. As a result, the angular position of control shaft 18 and of a contact arm 37, Figure 3, connected thereto is also proportional to the ambient temperature of the fluid. This is expressed by the relationship $$\theta_1 = K_1 T$$

where $\theta_1$ is the angular displacement of the shaft from a reference axis X, T is the ambient temperature, and $K_1$ is a constant.

With respect to the coil 22, when heat is supplied thereto, it will be apparent that the temperature of this element depends not only on ambient temperature, but also on the magnitude of heating current supplied thereto and upon the cooling effect of the fluid flowing past the element, this cooling effect being proportional to the velocity of fluid flow. Thus, the angular position of the stator 16 depends on ambient temperature, fluid flow, and the magnitude of heating current. This is expressed by the relationship $$\theta_2 = K_1 T + K_2 I^2 - K_3 V$$

where $\theta_2$ is the angular displacement of the stator, I is the heating current and V is the velocity of fluid flow, and $K_2$ and $K_3$ are constants.

Since, as stated, the temperature senstive elements function to eliminate the effect of ambient temperature fluctuations, the net resistance change is proportional to the square of the heating current and to the velocity of fluid flow. Since the heating current may be held constant or measured and compensated for, it will be apparent that the resistance of the unit 14 is directly proportional to the velocity of fluid flow. This may be expressed by the relationship $$\theta_2 - \theta_1 = K_2 I^2 - K_2 V$$

where $\theta_1 - \theta_2$ is the net movement of the contact arm with respect to the stator.

Figure 3:
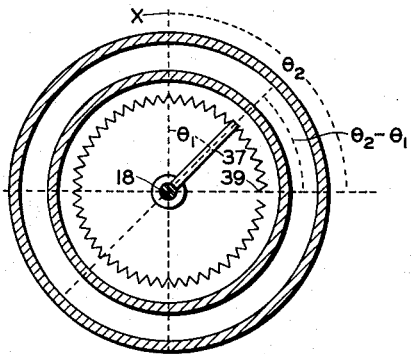

Assuming that the stator is displaced in a clockwise direction, Figure 3, through an angle $\theta_2$ from an original position in which the end 39 of the resistance element and the arm 37 were both positioned on the axis X, a change in resistance is produced which may be partially due to an increase in flow velocity and partially due to an increase in ambient temperature. At the same time however, resistance arm 37 moves through an angle $\theta_1$ to compensate for the increase in ambient temperature, so that the total change in resistance is proportional to the angle $\theta_2 - \theta_1$ representing an increase in flow only, rather than to the angle $\theta_2$ representing the combined effects of flow and temperature increase. Thus, any movement of the stator resulting from changes in ambient temperature are compensated for by a corresponding movement of the contact arm in the same direction, and through the same angle.

Figure 6:
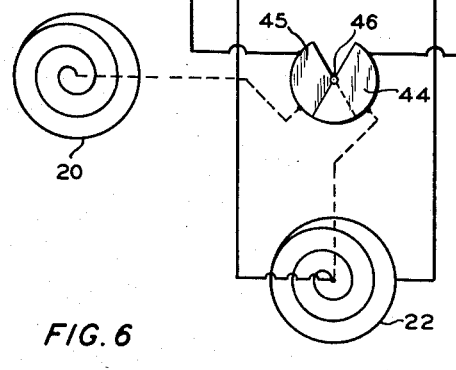
Figure 6 is a schematic diagram of a second embodiment of the invention.

A system employing a variable condenser is illustrated schematically in Figure 6 as comprising a pair of rotatable capacitor plates 44 and 45 which are connected to respective temperature-sensitive elements 22 and 20. Plates 44 and 45 are spaced from one another and rotatable about a common axis 46. The capacitance between plates 45 and 46 depends upon the relative position of the plates and is measured by a bridge circuit 48 which includes a variable capacitor 50 connected in one arm of the bridge adjacent the capacitor formed by plates 44 and 45. Resistors 51 and 52 form the other two arms of the bridge. A source of alternating voltage 54 is applied across first opposite terminals of bridge 48 and a current indicator 55 is connected across second opposite terminals of bridge 48. Such a system is conventional for use in measuring capacitance. Heating current for element 22 is supplied by a voltage source 56 through leads 57 and 58.

Accordingly, it is apparent that we have provided an improved flowmeter in which ambient temperature changes are automatically compensated for. The apparatus is of very simple construction and, if a water-proof variable resistance is utilized, no difficult sealing problems are encountered. In addition, the alternating and direct current circuits are effectively separated in the preferred embodiment of this invention so that a minimum number of cable conductors is required for actuating the flowmeter. The meter 30 may be calibrated so that the flow velocity may be read directly or, of course, the meter may be replaced by a suitable recording device to provide a permanent record of the flow velocity.

While the invention has been described in connection with a present, preferred embodiment thereof, it is to be understood that this description is illustrative only and is not to be considered as limiting the invention, the scope of which is defined by the appended claims.

Having described our invention, we claim:

1. In a flow meter, a casing adapted to be lowered into a bore hole, said casing including a conduit section through which fluid in said bore hole passes, a variable resistance enclosed within said casing comprising a stator and a control shaft, a temperature sensitive element mechanically connected to said stator, a temperature sensitive element mechanically connected to said control shaft, said elements being so connected that an equal change in temperature of both elements causes rotation of the stator and control shaft in the same direction and by the same amount, and said elements being positioned within said conduit section of said casing for exposure to the fluid passing therethrough, and means for heating one of said elements whereby the resistance change produced by said one element is proportional both to ambient temperature and to rate of flow of fluid in said bore hole, the resistance change produced by the other element being proportional to the ambient temperature of said fluid and independent of the rate of flow thereof.

2. In a flow meter, a casing adapted to be lowered into a bore hole, a cable connecting said casing with the surface of the bore hole, electrical conductors in said cable, a variable resistance mounted in said casing having a stator and a control shaft, a circuit including a battery, a meter, and said resistance for measuring the ohmic value of said resistance, a pair of temperature sensitive expansible metal coils mounted in said casing for exposure to fluid in said bore hole, means mechanically connecting one of said coils to the stator of said variable resistance, means mechanically connecting the other coil to the control shaft of said variable resistance, said coils being so connected that an equal change in temperature of both coils produces rotation of the shaft and stator in the same direction and by the same amount, and means for supplying heating current through the conductors in said cable to one of said coils, whereby the resistance change produced by said one coil is proportional both to ambient temperature and rate of flow of fluid in said bore hole, and the resistance change produced by the other coil is proportional to ambient temperature but independent of the flow rate.

3. In a flow meter, a casing adapted to be lowered into a bore hole, a cable connecting said casing with the surface of the bore hole, electrical conductors in said cable, a variable resistance having a stator and a control shaft mounted in said casing, a circuit including first and second cable conductors, a battery, a meter, a choke, and said variable resistance, a pair of temperature sensitive expansible metal coils mounted in said casing for exposure to fluid in said bore hole, means mechanically connecting one of said coils to the stator of said variable resistance, means connecting the other coil to the control shaft of said variable resistance, said coils being so connected that an equal change in temperature of both coils produces rotation of the shaft and stator in the same direction and by the same amount, and a circuit for supplying heating current to one of said coils, said circuit including said first conductor, a third conductor, said one of said coils, a condenser, and an alternating current source, said condenser and said choke preventing interference between the alternating and direct currents in said circuits, whereby the resistance change produced by said one coil is proportional to rate of flow and to ambient temperature of the fluid in said bore hole, the resistance change produced by the other coil being proportional to ambient temperature but independent of flow rate.

4. In a flow meter, a casing adapted to be lowered into a bore hole, a variable resistance in said casing adapted to be connected in an electric circuit for producing signals at the surface, said resistance including a stator unit and a rotor unit, means responsive both to ambient temperature and to rate of flow of well fluid for moving one unit of said variable resistance, and means responsive solely to the ambient temperature of said well fluid for moving the other unit of said variable resistance, said moving means acting in like direction and like amounts whereby the signal produced by said variable resistance is proportional to rate of flow and independent of ambient temperature.

5. In a flow meter, a casing adapted to be lowered into a bore hole, a variable resistance in said casing having a stator unit and a rotor unit, a pair of temperature sensitive elements in said casing exposed to fluid in said bore hole, means mechanically connecting said temperature sensitive elements to the respective units of said variable resistance so that each element is adapted to change the ohmic value of said variable resistance, and means for supplying heat at a uniform rate to one of said temperature sensitive elements whereby said one element is responsive to ambient temperature and rate of flow of fluid in said bore hole, and the other element is responsive only to the ambient temperature of said fluid.

6. A fluid flow meter comprising, in combination, a casing defining a flow passage, a variable electrical impedance unit positioned within said casing, said impedance unit comprising first and second elements movable with respect to one another whereby the measurable impedance of said impedance unit depends upon the relative position of said two elements, first and second temperature sensitive elements positioned within the flow passage defined by said casing, means mechanically connecting said first and second temperature sensitive elements to respective said first-mentioned first and second elements whereby like changes in temperature of said temperature sensitive elements provide corresponding movements of said first-mentioned elements in the same direction and of like amounts whereby the measurable impedance of said impedance unit remains unchanged, and means for supplying heat at a predetermined rate to said first temperature sensitive element to cause movement of said first first-mentioned element which is proportional both to the ambient temperature of the fluid under measurement and the rate of flow as evidenced by the rate the supplied heat is removed from said first temperature sensitive element by the flow and movement of said second first-mentioned element is proportional only to the ambient temperature of the fluid whereby the measurable impedance of said impedance unit is representative of the fluid flow.

FRED L. McMILLAN.
BRUCE F. WILEY.

References Cited in the file of this patent

UNITED STATES PATENTS

| Number | Name | Date |
|---|---|---|
| 1,890,985 | Hamblen et al. | Dec. 13, 1932 |
| 1,903,713 | Baule | Apr. 11, 1933 |
| 2,225,941 | Hall | Dec. 24, 1940 |
| 2,264,487 | Smulski | Dec. 2, 1941 |
| 2,333,164 | Fisher | Nov. 2, 1943 |
| 2,390,384 | Poole | Dec. 4, 1945 |
| 2,524,150 | Vincent | Oct. 3, 1950 |